(12) United States Patent
Oliver et al.

(10) Patent No.: US 7,711,802 B2
(45) Date of Patent: May 4, 2010

(54) METHOD, SYSTEM, AND COMPUTER PROGRAM PRODUCT FOR ACTIVATING NON-SMS DEVICE USING CHAT PROTOCOL

(75) Inventors: David Michael Oliver, Pleasantville, NY (US); Richard Redpath, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1228 days.

(21) Appl. No.: 10/774,651

(22) Filed: Feb. 6, 2004

(65) Prior Publication Data

US 2005/0198237 A1   Sep. 8, 2005

(51) Int. Cl.
*G06F 15/177* (2006.01)
*G06F 15/16* (2006.01)

(52) U.S. Cl. .................................. 709/222; 709/206
(58) Field of Classification Search ......... 709/204–207, 709/222–230
See application file for complete search history.

(56) References Cited

U.S. PATENT DOCUMENTS

| 7,024,209 | B1 * | 4/2006 | Gress et al. ............. 455/466 |
| 2002/0073162 | A1 | 6/2002 | McErlean .................. 709/206 |
| 2006/0020677 | A1 * | 1/2006 | von Koch .................. 709/207 |

FOREIGN PATENT DOCUMENTS

WO   WO 01/158179 A2   1/2003

OTHER PUBLICATIONS

MSN Messenger Protocol, printed from hypothetic.org, Apr. 23-27, 2002.*
"Launch a PC's default browser", printed from developerfusion.co.uk, dated prior to Jul. 20, 2002.*

* cited by examiner

*Primary Examiner*—Yasin M Barqadle
(74) *Attorney, Agent, or Firm*—Kunzler Needham Massey & Thorpe

(57) ABSTRACT

A method, system, and computer-program product are disclosed, each of which enable the receipt of SIAs (Server Initiated Actions) on non-SMS-enabled devices, using existing infrastructure. An existing IP-based messaging protocol, such as "chat" architecture, is utilized as a transport for the SIAs. A network server constructs an SIA chat message and delivers it to the mobile client. The mobile client examines the chat message and, if it is configured to indicate that it is an SIA message, then the message is not shown on the mobile device, and an initiation command is executed, e.g., an indication is displayed to a user of the mobile client (e.g., to indicate the receipt of new email). Alternatively, upon receipt and identification of the SIA message, the mobile client can execute an initiation command causing the performance of a function identified by the SIA message, for example, to begin to download email immediately.

22 Claims, 4 Drawing Sheets

METHOD, SYSTEM, AND COMPUTER PROGRAM PRODUCT FOR ACTIVATING NON-SMS DEVICE USING CHAT PROTOCOL

BACKGROUND OF THE INVENTION

1. Field of the Invention

The present invention relates to mobile communications, and more particularly, the present invention relates to a method and system for activating non-SMS devices to send alerts to, and/or initiate actions on, the non-SMS devices.

2. Description of the Related Art

Server systems provide data access and interactive capability for mobile employee operations within an enterprise. Mobile employees can access server resources over the web, when connected, for such resources as email.

When new email has arrived at the enterprise server for distribution to a particular mobile employee (or group of mobile employees), the mobile employee(s) needs to be notified of the arrival of the mail, so that they know to connect to the enterprise server to download and read the email. The server can send such an alert using a Server Initated Action, or SIA. SIA's can be delivered to a mobile employee using SMS (Short Message Service) enabled devices such as cell phones. Using such systems, an SMS message is sent to the cell phone, thereby "waking up" the phone and allowing delivery of the SIA in the form of an alert message indicating the receipt of email. The user then takes action to connect to the enterprise server to download and read the email.

Mobile phones can be awakened as described above because all mobile phones have a very low power way to "listen" to a signaling channel, known as the "SS& signaling channel". It is on this channel that they are signaled when a call is incoming. The phone then initiates a high-power call setup with the nearest mobile tower and the call begins. As mobile telephony systems developed, the industry realized that the SS7 signaling channel could also be used for data, allowing data to be "pushed" to mobile telephones over the SS7 signaling channel. A desirable feature of this method of delivering data to a mobile telephone was that the phone was in a low-power mode but was still able to receive the information.

For IP networks, i.e., data networks, there is no such thing as an SS7 signaling channel. Signaling is performed in a "media access specific" manner, that is, it varies with the special characteristics of the electrical or optical transmission media being used for the transmission. There is no low-level protocol available to programmers via which a device can "listen" on its network interface for commands. Therefore, in virtually all wide area IP networks (including wireless IP networks) there is no low-power method to "emulate" the signaling ability of an SS7 signaling channel. Thus, there is no universal way for a service to contact a mobile device over a wide area IP network.

Since most mobile devices are enabled with wireless connectivity, one option is to have the mobile device connect wirelessly and poll the server for SIA's; however, new infrastructure to poll the server and allow the server to know the location of the device would have to be created, and one or more applications would have to be installed on the mobile device to monitor for the SIAs. Also, there are charges associated with having the mobile device connect wirelessly.

Accordingly, there is need for a simple method and system for enabling receipt of SIA's on a non-SMS-enabled device using existing infrastructure, and without incurring any substantial cost in connection with the receipt of the SIA's.

SUMMARY OF THE INVENTION

In accordance with the present invention, a method and system is provided to enable the receipt of SIAs on non-SMS-enabled devices, using existing infrastructure. In accordance with the present invention, an IP-based messaging protocol, such as existing "chat" architecture, is utilized to act as a transport for messages. A network server constructs an SIA chat message and delivers it to the mobile client. The mobile client examines the chat message and, if the message is configured to indicate that it is an SIA message, then the message is not shown to the user, and an indication is displayed advising the user of the purpose of the SIA message (e.g., to indicate the receipt of new email). Alternatively, upon receipt and identification of the SIA message, an action causing the mobile client to perform a function identified by the SIA message can be initiated, for example, to begin to download email immediately.

In an exemplary embodiment, the present invention comprises a method for activating a non-SMS device connectable to an IP-based network, comprising the steps of sending an activation message to the non-SMS device over an IP-based messaging protocol.

DETAILED DESCRIPTION OF THE PREFERRED EMBODIMENTS

Figure 1:
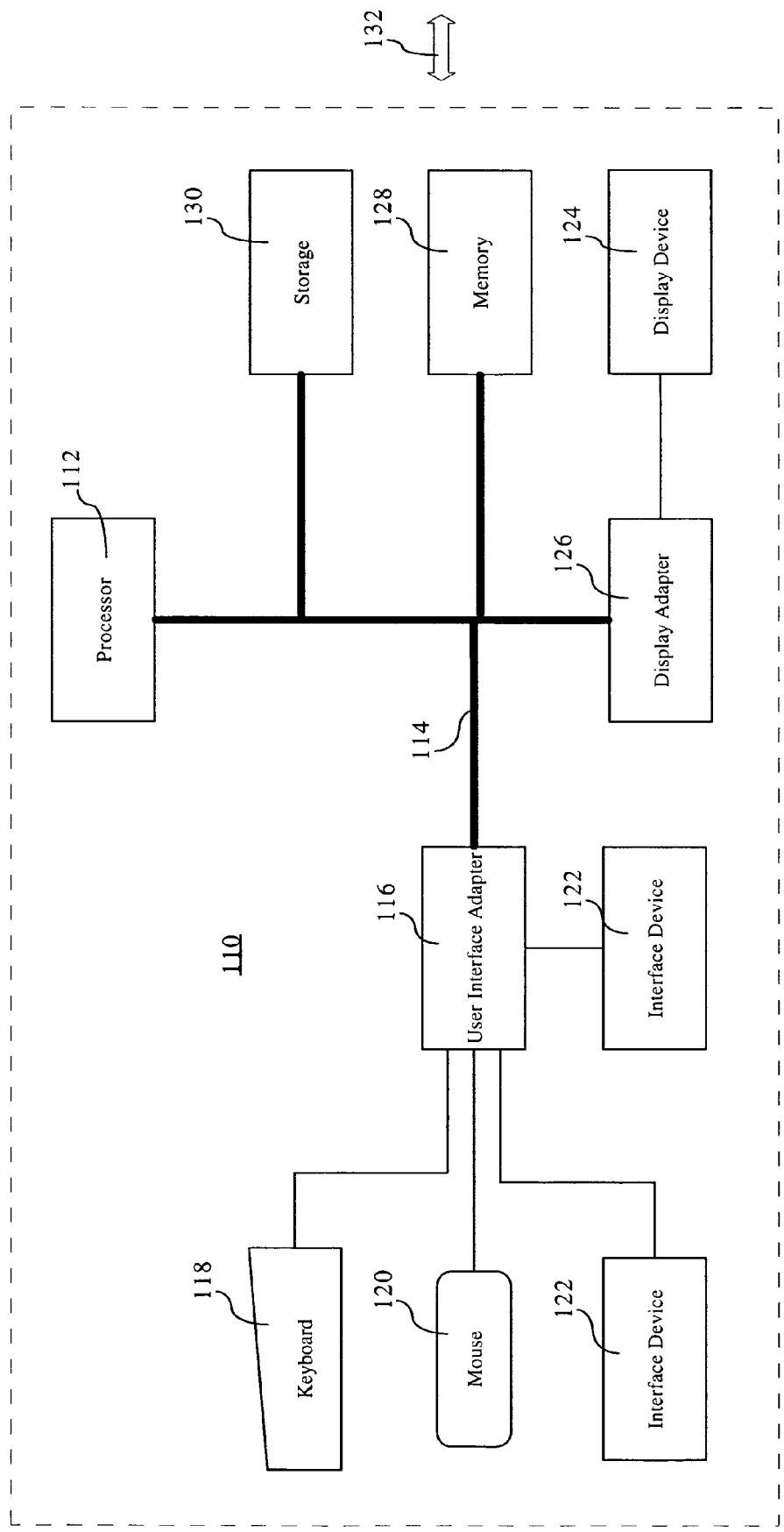
FIG. 1 illustrates a representative workstation hardware environment in which the present invention may be practiced.

FIG. 1 illustrates a representative workstation hardware environment in which the present invention may be practiced. The environment of FIG. 1 comprises a representative single user computer workstation 110, such as a personal computer, including related peripheral devices. The workstation 110 includes a microprocessor 112 and a bus 114 employed to connect and enable communication between the microprocessor 112 and the components of the workstation 110 in accordance with known techniques. The workstation 110 typically includes a user interface adapter 116, which connects the microprocessor 112 via the bus 114 to one or more interface devices, such as keyboard 118, mouse 120, and/or other interface devices 122, which can be any user interface device, such as a touch sensitive screen, digitized entry pad, etc. The bus 114 also connects a display device 124, such as an LCD screen or monitor, to the microprocessor 112 via a display adapter 126. The bus 114 also connects the microprocessor 112 to memory 128 and long term storage 130 which can include a hard drive, tape drive, etc.

The workstation 110 communicates via a communications channel 132 with other computers or networks of computers. The workstation 110 may be associated with such other computers in a local area network (LAN) or a wide area network, or the workstation 110 can be client in a client/server arrangement with another computer, etc. All of these configurations, as well as the appropriate communications hardware and software, are known in the art.

Figure 2:
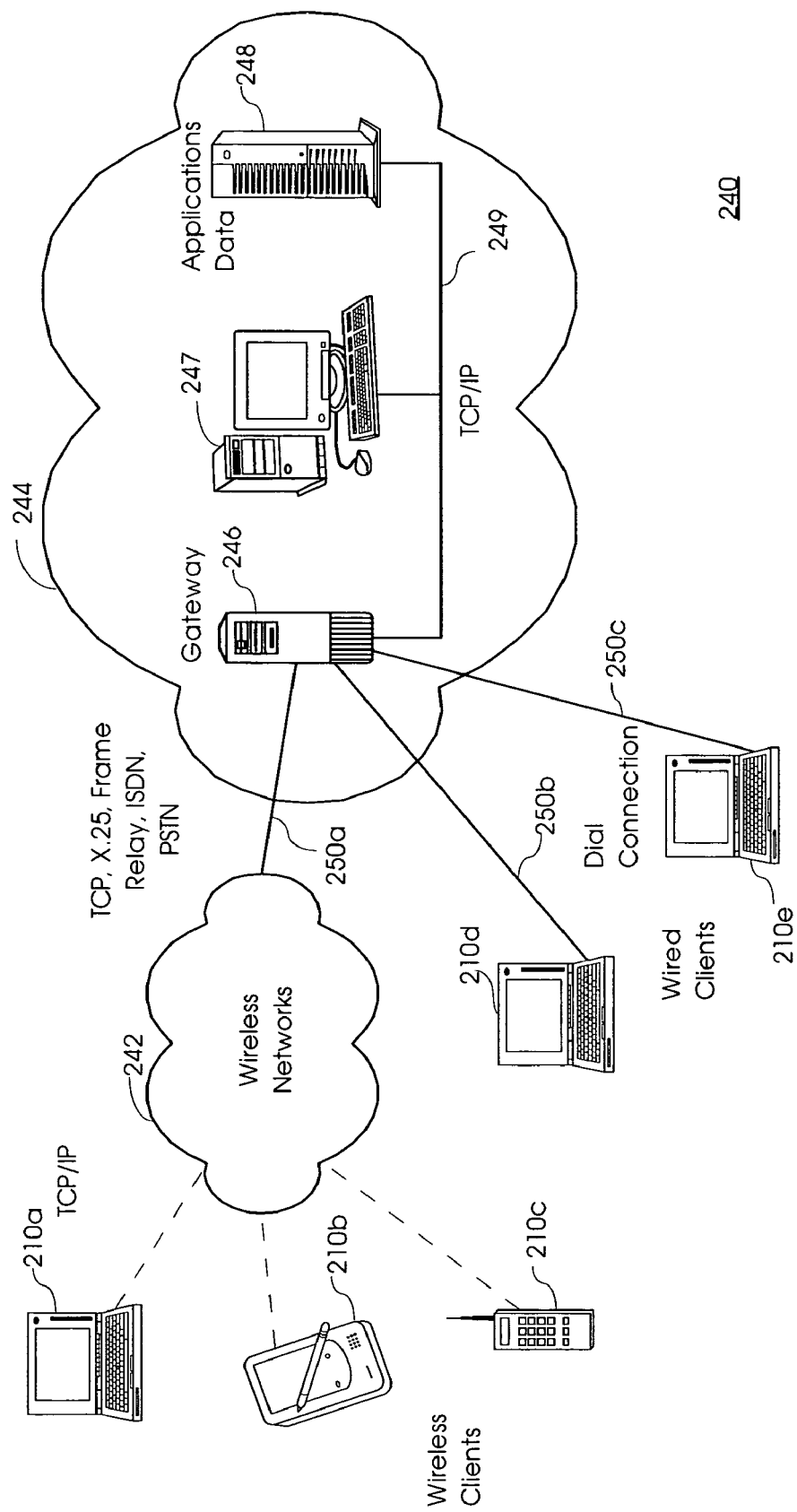
FIG. 2 illustrates an exemplary data processing network in which the present invention may be practiced.

FIG. 2 illustrates an exemplary data processing network 240 in which the present invention may be practiced. The data processing network 240 may include a plurality of individual networks, such as wireless network 242 and network 244, each of which may include a plurality of individual workstations/devices, e.g. 210a, 210b, 210c. Additionally, as those skilled in the art will appreciate, one or more LANs may be included (not shown), where a LAN may comprise a plurality of intelligent workstations coupled to a host processor.

The networks 242 and 244 may also include mainframe computers or servers, such as a gateway computer 246 or application server 247 (which may access a data repository 248). A gateway computer 246 serves as a point of entry into each network 244. The gateway computer 246 may be preferably coupled to another network 242 by means of a communications link 250a. The gateway computer 246 may also be directly coupled to one or more workstations, e.g 210d, 210e using a communications link 250b, 250c. The gateway computer 246 may be implemented using any appropriate processor, such as IBM's Network Processor. For example, the gateway computer 246 may be implemented using an IBM pSeries (RS/6000) or xSeries (Netfinity) computer system, an Enterprise Systems Architecture/370 available from IBM, an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.) These are merely representative types of computers with which the present invention may be used.

The gateway computer 246 may also be coupled 249 to a storage device (such as data repository 248). Further, the gateway 246 may be directly or indirectly coupled to one or more workstations/devices 210d, 210e, and servers such as application server 247.

Those skilled in the art will appreciate that the gateway computer 246 may be located a great geographic distance from the network 242, and similarly, the workstations/devices may be located a substantial distance from the networks 242 and 244. For example, the network 242 may be located in California, while the gateway 246 may be located in Texas, and one or more of the workstations/devices 210 may be located in New York. The workstations/devices 210 may connect to the wireless network 242 using a networking protocol such as the Transmission Control Protocol/Internet Protocol ("TCP/IP") over a number of alternative connection media, such as cellular phone, radio frequency networks, satellite networks, etc. The wireless network 242 preferably connects to the gateway 246 using a network connection 250a such as TCP or UDP (User Datagram Protocol) over IP, X.25, Frame Relay, ISDN (Integrated Services Digital Network), PSTN (Public Switched Telephone Network), etc. The workstations/devices 210 may alternatively connect directly to the gateway 246 using dial connections 250b or 250c. Further, the wireless network 242 and network 244 may connect to one or more other networks (not shown), in an analogous manner to that depicted in FIG. 2.

The present invention may be used on a client computer or server in a networking environment, or on a standalone workstation (for example, to prepare a file or to process a file which has been received over a network connection, via a removable storage medium, etc.). References herein to client and server devices are for purposes of illustration and not of limitation: the present invention may also be used advantageously with other networking models. When used in a networking environment, the client and server devices may be connected using a wired connection or a wireless connection. Wired connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The workstation or client computer may be any type of computer processor, including laptop, handheld or mobile computers; vehicle-mounted devices; desktop computers; mainframe computers; etc., having processing (and, optionally, communication) capabilities. The server, similarly, can be one of any number of different types of computer which have processing and communication capabilities. These techniques are well known in the art, and the hardware devices and software which enable their use are readily available.

Figure 3:
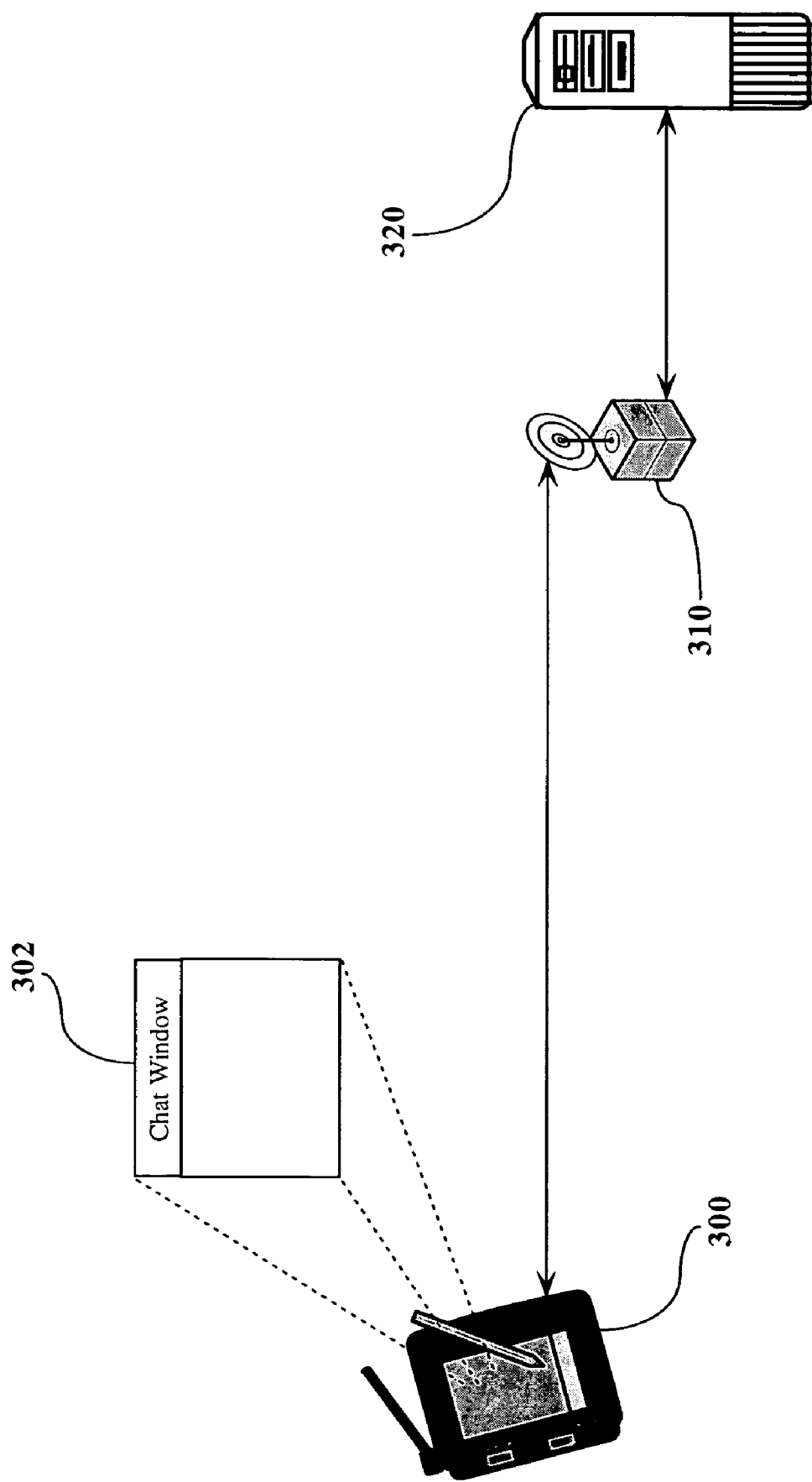
FIG. 3 illustrates an example of the architecture of an embodiment of the present invention.

FIG. 3 illustrates an example of the architecture of one embodiment of the present invention. Referring to FIG. 3, a wireless device 300 is pre-configured to communicate with an enterprise server 320 via a wireless hub 310. More specifically, wireless device 300 is "chat-enabled" as indicated by chat window 302. In a well-known manner, a user of mobile device 300 can participate in chat communications between mobile device 300 and enterprise server 320 (and other chat users readable via enterprise server 320). This is an example of an IP-based messaging system.

However, in accordance with the present invention, mobile device 300 is configured to evaluate incoming chat messages from server 320 and specifically identify SIA chat messages. This can be accomplished by, for example, configuring a processor of mobile device 300 to "look" for a chat message that includes particular code or other indicia of the existence of an SIA message. When such an SIA message is identified by mobile device 300, in accordance with the present invention, mobile device 300 will not display the code, but will instead display a message to the user indicating, for example, the receipt of email. Alternatively, or, in addition, upon receipt and identification of such an encoded message, mobile device 300 can be configured to initiate any action indicated by the message, for example, to launch an email program and begin downloading the new email message.

Figure 4:
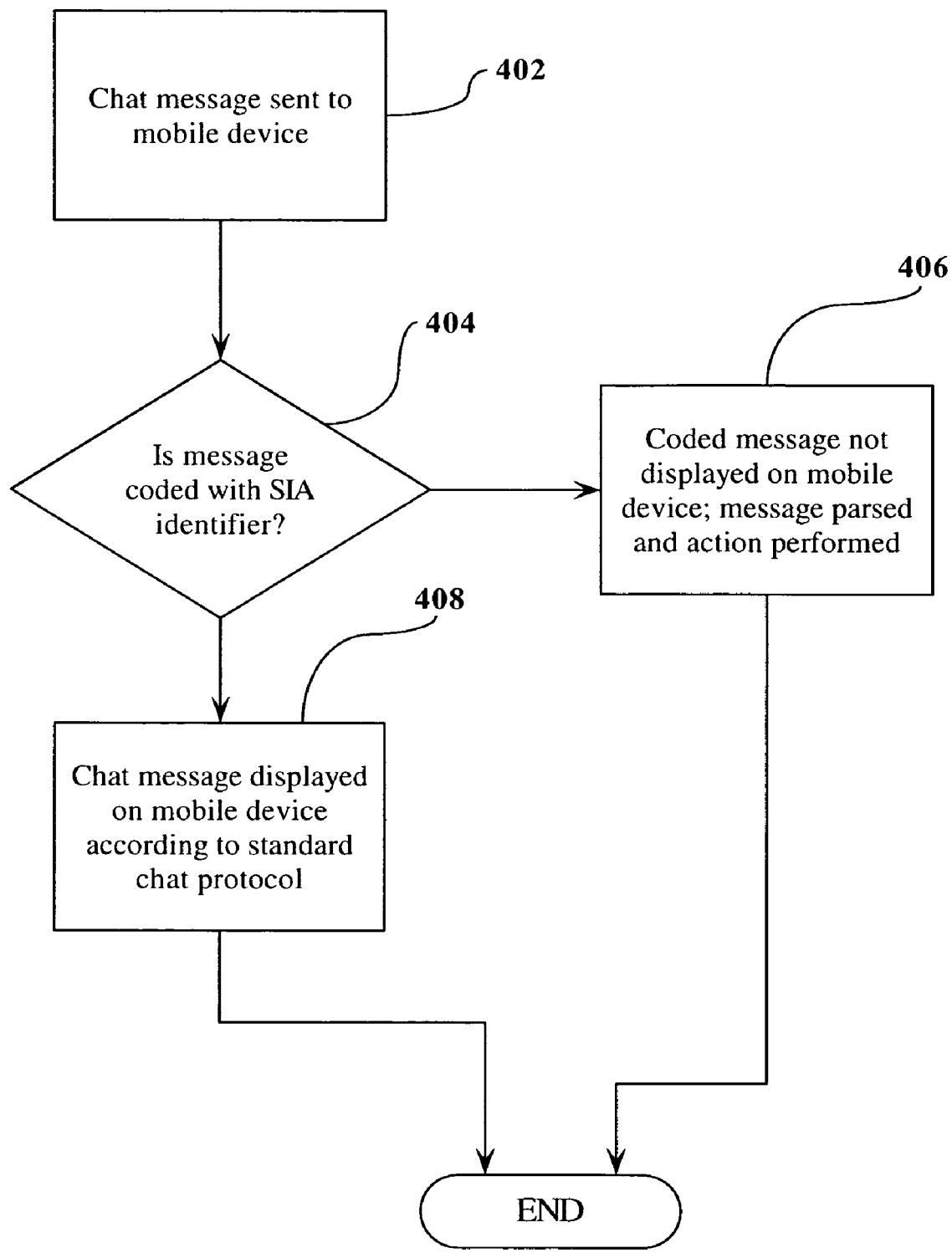
FIG. 4 is a flowchart illustrating an example of logical steps performed in accordance with the present invention.

FIG. 4 is a flowchart illustrating an example of logical steps performed in accordance with the present invention. At step 402, the enterprise server sends an IP-based message, such as a chat message, to the mobile client. The message is received in an ordinary manner at the mobile client, and, at step 404, a determination is made as to whether or not the message is coded with an "SIA message identifier." An "SIA message identifier" is simply section of code, preferably a prefix, that indicates to the chat program receiving the message that what follows is an SIA message not for display to the user.

If the chat message is a regular, chat message not coded with an SIA identifier, then the process proceeds to step 408, where the message is displayed on the mobile client according to standard chat protocol. However, if the message contains an SIA message identifier, then the process proceeds to step 406, where the SIA-coded message itself is "absorbed" (not displayed to the user) and parsed, and any action directed by the code in the message is performed. For example, the SIA-coded message can include an initiation command, directing the issuance of an alert (audible alarm, flash a message on the mobile device, etc.) indicating to the mobile employee that some action (e.g., the receipt of new email) has occurred. Alternatively, the SIA-coded message might include an initiation command that causes the mobile device to initiate an action, such as to automatically launch an email program to establish a connection to the enterprise server and automatically download new email.

As noted above, the coded message that is constructed by the enterprise server to deliver the SIA-coded message contains an SIA message identifier, i.e., some indicia identifying it as an SIA message, such as a prefix that is kept private and would not typically be typed in a normal chat message. For example, the enterprise server could construct a message: "x-ibm-sia:010402,k01400208020" and send it to the mobile device as a chat message. Such a message is also referred to herein as an "activation message" to distinguish it from a regular chat message.

The chat program running on the mobile device is configured to "look for" the prefix (SIA message identifier) "x-ibm-sia" and, when such a prefix is identified, absorb the prefix and the message (initiation command) that follows. The initiation command following the SIA message identifier will cause the mobile device to perform a function, such as deliver an alert to the mobile device that indicates to the user that email has been received. As noted above, the mobile device can also be configured to launch a program to commence downloading of the email. The initiation command following the SIA message identifier is preferably encoded using standard security techniques to prevent spamming and controlling of the device by people with unauthorized or malicious purposes.

The present invention takes advantage of the fact that IP-based messaging programs, such as chat programs, are commonly "always on" programs on user's mobile devices and thus provide an established, in-place "conduit" for use in alerting users of an incoming SIA. No additional infrastructure needs to be put in place and no additional costs are incurred by the enterprise or the users of the enterprise, since the user will have the chat program open and enabled whether or not any SIA messages need to be communicated to the mobile device. This provides a transparent method of providing SIA's from an enterprise server resource to a client mobile device, using the registration and location infrastructure already built into the chat software and system.

Thus, the present invention "piggybacks" an SIA message on an existing communications stream, enabling it to be used for an additional, auxiliary purpose than that for which it is initially provided.

The above-described steps can be implemented using standard, well-known programming techniques. The novelty of the above-described embodiment lies not in the specific programming techniques but in the use of the steps described to achieve the described results. Software programming code which embodies the present invention is typically stored in permanent storage of some type, such as permanent storage located on the hand-held device. In a client/server environment, such software programming code may be stored with storage associated with a server. The software programming code may be embodied on any of a variety of known media for use with a data processing system, such as a diskette, or hard drive, or CDROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, the figures herein support combinations of means for performing the specified functions, combinations of steps for performing the specified functions, and program instruction means for performing the specified functions.

Although the present invention has been described with respect to a specific preferred embodiment thereof, various changes and modifications may be suggested to one skilled in the art and it is intended that the present invention encompass such changes and modifications as fall within the scope of the appended claims.

The invention claimed is:

1. A method for activating a non-SMS device connectable to an IP-based network, comprising the steps of:
  receiving an activation message at a non-SMS device over an IP-based messaging protocol, the non-SMS device comprising a mobile communications device that is unable to receive an SMS communication over a signaling system 7 ("SS7") signaling channel, the activation message comprising a server initiated action ("SIA") message identifier and an initiation command embedded in the activation message, the initiation command comprising an action for execution on the non-SMS device, wherein the action of the initiation command is auxiliary to the IP-based messaging protocol;
  determining whether the activation message comprises the SIA message identifier;
  preventing display of the activation message to a user in response to the activation message comprising the SIA message identifier;
  parsing the activation message to locate the embedded initiation command in response to the activation message comprising the SIA message identifier; and
  automatically initiating the action of the initiation command in the activation message in response to the activation message comprising the SIA message identifier.

2. The method of claim 1, wherein the initiation command initiates the action by said non-SMS device.

3. The method of claim 1, wherein said IP-based messaging protocol comprises a chat protocol.

4. The method of claim 2, wherein said action initiated by said initiation command comprises the issuance of an alert by said non-SMS device.

5. The method of claim 4, wherein said alert comprises an indication that there is new email available for download over said IP-based network.

6. The method of claim 2, wherein said action initiated by said initiation command comprises the launching of a program on said non-SMS device to download email via said IP-based network.

7. A system for activating a non-SMS device connectable to an IP-based network, comprising:
  means for receiving an activation message at a non-SMS device over an IP-based messaging protocol, the non-SMS device comprising a mobile communications device that is unable to receive an SMS communication over a signaling system 7 ("SS7") signaling channel, the activation message comprising a server initiated action ("SIA") message identifier and an initiation command embedded in the activation message, the initiation command comprising an action for execution on the non- SMS device, wherein the action of the initiation command is auxiliary to the IP-based messaging protocol;

means for determining whether the activation message comprises the SIA message identifier;

means for preventing display of the activation message to a user in response to the activation message comprising the SIA message identifier;

means for parsing the activation message to locate the embedded initiation command in response to the activation message comprising the SIA message identifier; and means for automatically initiating the action of the initiation command in the activation message in response to the activation message comprising the SIA message identifier.

8. The system of claim 7, wherein the initiation command initiates the action by said non-SMS device.

9. The system of claim 8, wherein said IP-based messaging protocol comprises a chat protocol.

10. The system of claim 8, wherein said action initiated by said initiation command comprises the issuance of an alert by said non-SMS device.

11. The system of claim 10, wherein said alert comprises an indication that there is new email available for download over said IP-based network.

12. The system of claim 8, wherein said action initiated by said initiation command comprises the launching of a program on said non-SMS device to download email via said IP-based network.

13. A computer program product for activating a non-SMS device connectable to an IP-based network, the computer program product comprising a computer-readable storage medium having computer-readable program code embodied in the medium, the computer-readable program code comprising:

computer-readable program code that receives an activation message at a non-SMS device over an IP-based messaging protocol, the non-SMS device comprising a mobile communications device that is unable to receive an SMS communication over a signaling system 7 ("SS7") signaling channel, the activation message comprising a server initiated action ("SIA") message identifier and an initiation command embedded in the activation message, the initiation command comprising an action for execution on the non-SMS device, wherein the action of the initiation command is auxiliary to the IP-based messaging protocol;

computer readable program code that determines whether the activation message comprises the SIA message identifier;

computer readable program code that prevents display of the activation message to a user in response to the activation message comprising the SIA message identifier;

computer readable program code that parses the activation message to locate the embedded initiation command in response to the activation message comprising the SIA message identifier; and computer readable program code that automatically initiates the action of the initiation command in the activation message in response to the activation message comprising the SIA message identifier.

14. The computer program product of claim 13, wherein the initiation command initiates the action by said non-SMS device.

15. The computer program product of claim 13, wherein said IP-based messaging protocol comprises a chat protocol.

16. The computer program product of claim 14, wherein said action initiated by said initiation command comprises the issuance of an alert by said non-SMS device.

17. The computer program product of claim 16, wherein said alert comprises an indication that there is new email available for download over said IP-based network.

18. The computer program product of claim 14, wherein said action initiated by said initiation command comprises the launching of a program on said non-SMS device to download email via said IP-based network.

19. A method of activating a chat enabled, non-SMS device, comprising the configuring of the non-SMS device to:

receive a chat message over an IP-based messaging protocol, the non-SMS device comprising a mobile communications device that is unable to receive an SMS communication over a signaling system 7 ("SS7") signaling channel, the chat message comprising a server initiated action ("SIA") message identifier and an initiation command embedded in the chat message;

determine that the chat message comprises the SIA message identifier;

prevent display of the chat message to a user upon receipt in response to the chat message comprising the SIA message identifier;

parse the chat message to locate the embedded initiation command in response to the chat message comprising the SIA message identifier; and automatically execute instructions from the chat message to activate the non-SMS device to perform the initiation command of the chat message in response to the chat message comprising the SIA message identifier, the initiation command comprising an action for execution on the non-SMS device, wherein the action of the initiation command is auxiliary to the IP-based messaging protocol.

20. The method of claim 19, wherein said action comprises the issuing of an alert indicating the receipt of an email message by the server initiating said SIA.

21. The method of claim 19, wherein said action comprises the execution of a program to automatically connect said non-SMS device to the server initiating the SIA and download email newly received by said server.

22. A method of activating a chat enabled, non-SMS device via an SIA chat message, comprising the steps of:

configuring the non-SMS device to:

receive a chat message over an IP-based messaging protocol, the non-SMS device comprising a mobile communications device that is unable to receive an SMS communication over a signaling system 7 ("SS7") signaling channel, the chat message comprising a server initiated action ("SIA") message identifier and an initiation command embedded in the chat message;

determine that the chat message comprises the SIA message identifier; and automatically execute instructions from the chat message to activate the non-SMS device in response to the chat message comprising the SIA message identifer; and activating the non-SMS device by sending a chat message to the non-SMS device, the chat message comprising an initiation command to activate the non-SMS device to automatically perform an action contained in the chat message, wherein the action of the initiation command is auxiliary to the IP-based messaging protocol.

* * * * *